United States Patent

[11] 3,614,787

[72] Inventor Gerald E. Hart
 P.O. Box 245, Heathsville, Va. 22473
[21] Appl. No. 720,511
[22] Filed Mar. 10, 1958
[45] Patented Oct. 19, 1971

[54] SIGNAL DISPLAY SYSTEM
 9 Claims, 4 Drawing Figs.
[52] U.S. Cl. .................................................. 343/11 R,
 343/13 R, 343/100 PE
[51] Int. Cl. ....................................................... G01s 9/06
[50] Field of Search............................................ 343/5, 10,
 11, 17.1, 12, 13, 100 PE

[56] References Cited
 UNITED STATES PATENTS
 2,851,681 9/1958 Cohn............................ 343/5
 FOREIGN PATENTS
 750,600 6/1956 Great Britain................ 343/5

Primary Examiner—T. H. Tubbesing
Attorneys—Joseph A. O'Connell and Richard C. Reed ABSTRACT: In a pulse echo-ranging system, means for transmitting electromagnetic waves having a selected sense of circular polarization, first means for receiving first echo signals having said selected sense of circular polarization, second means for receiving second echo signals having a sense of circular polarization, said second means for receiving second echo signals having sense of circular polarization opposite to said selected sense of circular polarization, differencing means connected to said first means and said second means for generating third signals in dependency upon the difference in magnitude of said first echo signals and said second echo signals, azimuth sweep-generating means for generating fourth signals, pulse-timing means for generating fifth signals, means connected to said azimuth sweep-generating means and said pulse-timing means for synchronizing the start of said pulse-timing means and said azimuth sweep-generating means, mixer means, means connected between said mixer means and said differencing means for applying said third signals to said mixer means, means connected between said azimuth sweep-generating means and said mixer means for applying said fourth signals to said mixer means, range sweep-generating means, means for applying the output of said pulse-timing means to simultaneously trigger said transmitting means and said range sweep-generating means, summing means connected to said first and second means for generating a sixth signal in dependency upon the sum of the magnitudes of said first echo signals and said second echo signals, a cathode-ray tube having beam intensity control means and beam deflection means, means for applying the output of said mixer means and said range sweep-generating means to said beam deflection means of said cathode-ray tube, plus means for applying the output of said summing means to said beam intensity control means of said cathode-ray tube.

In a pulse echo-ranging system, means for transmitting electromagnetic energy having a selected sense of circular polarization, first means for receiving first echo signals having said selected sense of circular polarization, second means for receiving second echo signals having a sense of circular polarization opposite to said selected sense of circular polarization, means connected to said first means and said second means for providing a third signal in dependency upon the difference between the logarithm of the magnitudes of said first echo signals and said second echo signals, visual display means, including an intensity grid, connected to said last mentioned means for visually displaying said third signal in an area-type presentation, summing means for summing the magnitudes of the first echo signals and the second echo signals, and means for applying the output of said summing means to the intensity grid of the visual display means.

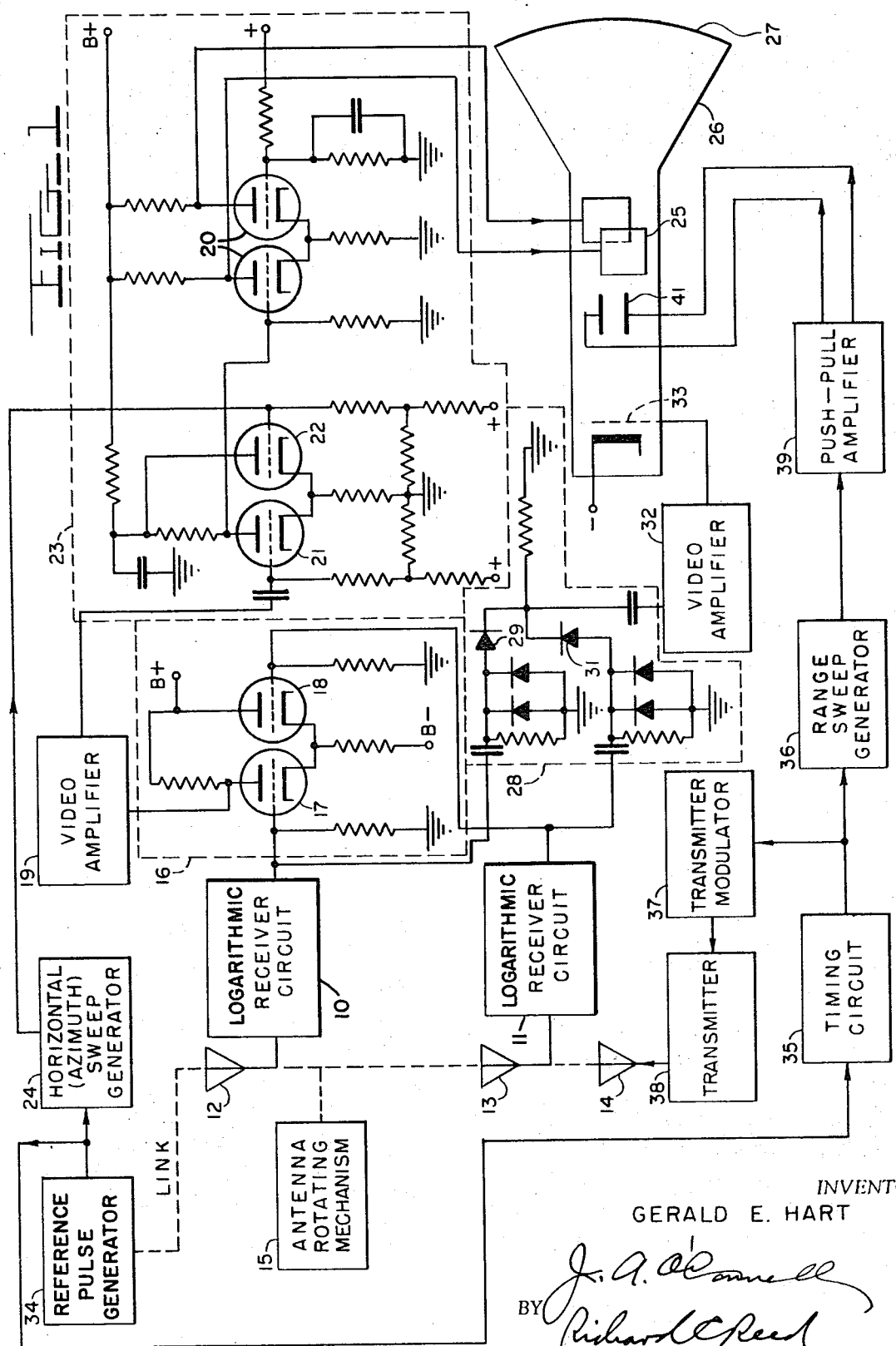

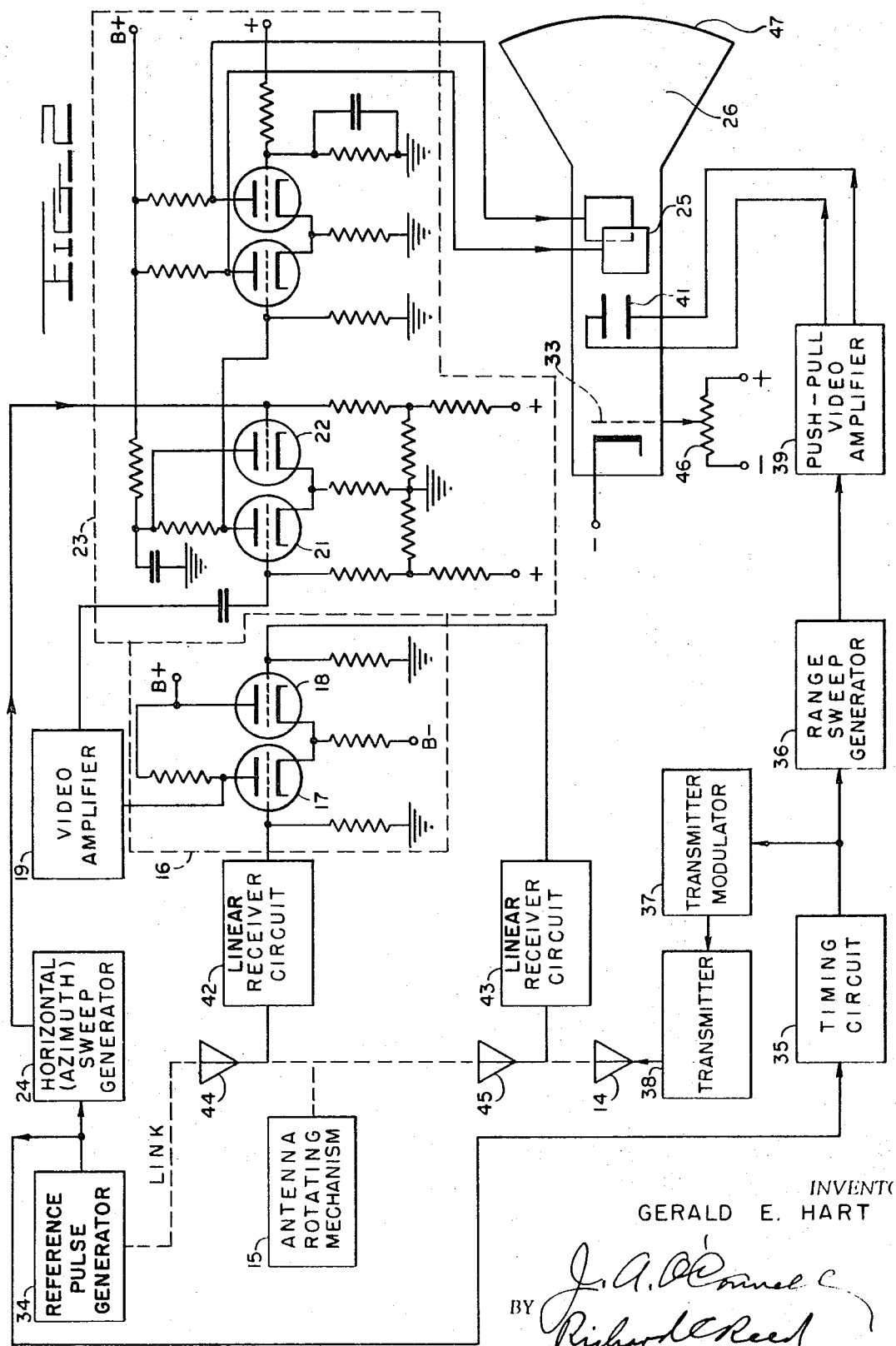

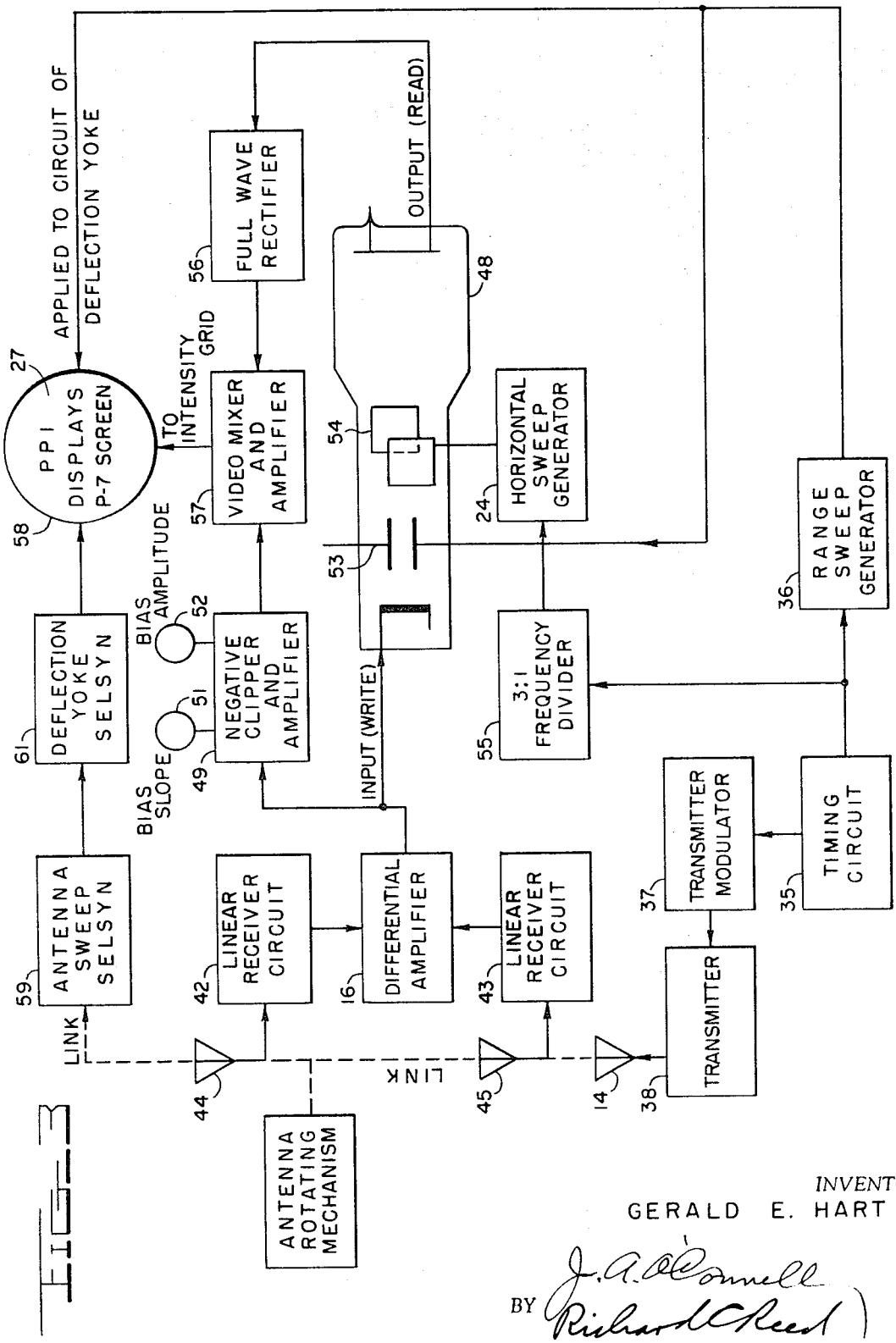

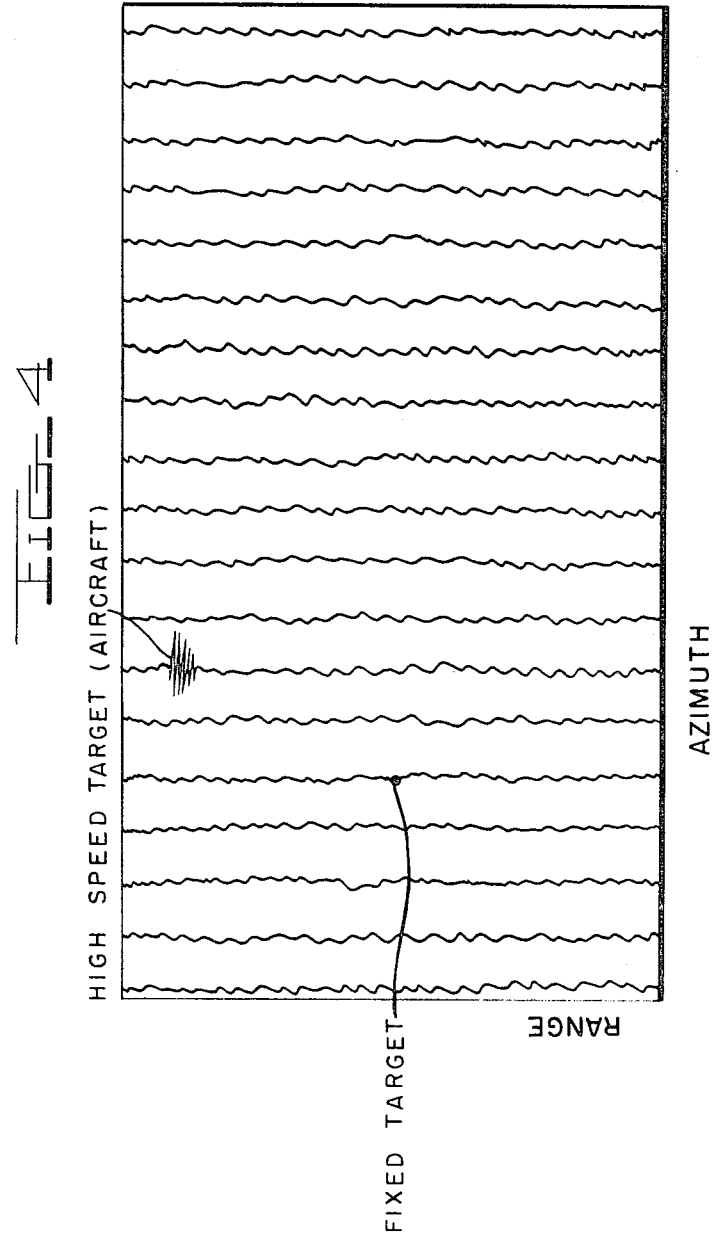

SIGNAL DISPLAY SYSTEM

The invention described herein may be manufactured and used by or for the Government of the United States of America for governmental purposes without the payment of any royalties thereon or therefor.

This invention relates to radar systems in general and more particularly to a rotationally polarized radar system.

In radio detecting and tracking systems which are at present in common use, planar polarized radio energy is utilized for pulse transmission purposes. It is herein proposed to use rotationally polarized radio energy pulses for a radar system in order to provide an improvement in detection and visual discrimination between moving targets, stationary targets and ground clutter.

An object of the prevent invention is to provide a radar system utilizing rotationally polarized radio energy.

Another object of the present invention is to provide better visual discrimination between moving targets, stationary targets, and ground clutter.

A further object of the present invention is the provision for a system favoring the detection of stable echoes in a background of fluctuating echoes.

Still a further object of the present invention is the provision for a system that favors the detection of rapidly fluctuating echoes.

Other and further objects and features of the present invention will become apparent upon a careful consideration of the following description and the accompanying drawings wherein:

FIG. 1 is a diagram of a double-sense circularly polarized radar system with logarithmic intermediate frequency amplifiers suitable for the detection of stationary targets in a background of ground clutter.

FIG. 2 is a diagram of a double-sense circularly polarized radar system with linear intermediate frequency amplifiers suitable for the detection of rapidly moving targets in a background of ground clutter.

FIG. 3 illustrates a double-sense circularly polarized radar system with linear intermediate frequency amplifiers employing a storage tube to aid in the detection of rapidly moving targets in a background of ground clutter.

FIG. 4 is a radar display showing separate traces with horizontal deflections proportional to the difference signal between the two receiving antennas.

In brief, the basic components of the present invention consist of a radio transmitter and two receivers operating on the radar pulse echo technique. However, the propagated pulse is rotationally polarized, i.e., circularly polarized. Elliptical polarization may possibly be used but circular polarization is the preferred type. The reflected signal or echo may possess either the same or opposite rotational sense as the transmitted signal depending on the target, and the ellipticity ratio may vary from one to infinity. One receiving antenna is designed to receive return energy having the same polarization sense as that of the energy emitted by the transmitter antenna. The other receiving antenna picks up energy having only the opposite sense of polarization. The signals are separately detected and fed to (1) a differential amplifier and (2) an additive mixer. The output of the differential amplifier and the signal from the horizontal sweep generator are combined in a modulator and fed to the horizontal plates of a cathode-ray tube oscilloscope. Echoes from rapidly moving targets are usually weak and fluctuate rapidly from predominantly one polarization sense to the other, thus rapidly moving targets will cause a rapid fluctuation of the signal from the differential amplifier and give an indication on the scope as a rapidly fluctuating horizontal deflection. The additive mixer combines the two signals from the two receiver antennae and the summed output signal passes through a video amplifier to the intensity grid of the scope which causes a brightness variation on the scope screen. Stationary target echoes are strong steady signals of predominantly one polarization sense or the other and when passed through the additive mixer cause a bright spot on the scope screen. Other variations of the above embodiment include omitting the additive mixer to favor the display of rapidly moving targets or using a storage tube to select only signals above a predetermined fluctuation rate.

Referring now to FIG. 1, the two receiver circuits 10 and 11 are substantially conventional systems each comprising an antenna, 12 and 13 respectively, mixer, local oscillator, logarithmic intermediate frequency amplifier, and a detector. The receiver antennae 12 and 13 are linked in alignment with the transmitter antenna 14 so that all three will move in synchronism when driven by the antennae-rotating mechanism 15. If the antenna 12 of the receiver circuit 10 receives signals with the same sense of circular polarization as the transmitter antenna 14 then the antenna 13 of receiver circuit 11 will receive signals with the opposite sense of circular polarization as transmitter antenna 14. The two receiver circuits 10 and 11 are connected to both of two branch circuits. In one branch circuit the signals from receiver circuits 10 and 11 are applied to the differential amplifier 16 which contains two triode tubes 17 and 18 which are parallel with coupled cathodes. Receiver circuit 10 is connected to the grid of the triode tube 17 and receiver circuit 11 is connected to the grid of the triode tube 18. A difference signal which is dependent on the difference between the input signals from receiver circuits 10 and 11 is obtained at the plate of triode tube 17 and applied to a video amplifier 19. The video amplifier 19 amplifies the difference signal and applies it to the grid of triode tube 21, one of two triode tubes, 21 and 22, of the horizontal sweep modulator 23.

A horizontal deflection signal from the horizontal sweep generator 24 is applied to the grid of the triode tube 22. The mixed signal is obtained at the plate of the triode tube 21 and applied to a push-pull amplifying stage 20 within the horizontal sweep modulator 23. After amplification the signal output from the horizontal sweep modulator 23 is applied to the horizontal plates 25 of the scope 26 which typically, may be a cathode-ray tube B-scope indicator with a P-7 screen 27. In the other branch circuit, the signals from receiver circuits 10 and 11 are applied to an additive mixer 28 which includes two diodes 29 and 31. The signal from r receiver circuit 10 is applied to one diode 29 and the signal from receiver circuit 11 is applied to diode 31. The two signals are summed by the additive mixer 28 and applied to a video amplifier 32. The amplified signal is then fed to the intensity grid 33 of the scope 26.

The horizontal sweep generator 24 is triggered by a signal from the antenna azimuth reference pulse generator 34 that is mechanically linked with the antennae 12, 13 and 14 to synchronize the start of the horizontal sweep with a definite antenna position. The signal from the antenna azimuth reference pulse generator 34 also triggers the timing circuit 35 which maintains a synchronous relationship between the multiple vertical range sweeps occurring during each horizontal sweep. The timing circuit 35 sends a pulse for every range sweep to the range sweep generator 36 and the transmitter modulator 37 which in turn triggers the transmitter circuit 38. The range sweep signal generated by the range sweep generator 36 passes through a push-pull amplifier 39 and is applied to vertical plates 41 of the scope 26.

The scanning rate of the antenna of FIG. 1 should be in the region of 15–30 revolutions per second. A typical embodiment using a 3° beamwidth dish (2.1° two-way transmission beamwidth) and a pulse repetition frequency of 2,560 would provide one pulse per two-way transmission beamwidth at the minimum scanning rate of 15 r.p.s. and have a maximum range of 28 miles.

The rapid rate of antenna scan is necessary because of the 13 clutter fluctuation rate which makes the range traces of the scope weave constantly. If the sampling rate (which, in effect, is the scanning rate for high-speed scanning) is not high enough the ground clutter fluctuation will cause a trace representing a particular bearing angle to deviate so far from the previous trace at that bearing that the visual indication will be confused due to lack of continuity of clutter information. Under such conditions it would be impossible to determine the relative fluctuation rate of the target and the clutter because both would appear as a cluster of horizontally displaced dots. With an adequate scanning rate (one which would provide several samples per clutter fluctuation cycle) the clutter fluctuation rate is readily apparent whereas the target echo will appear as a blur indicating a much higher fluctuation rate. Then, as the ground clutter causes the trace to deviate slowly with a constantly weaving motion, the movement can be followed visually and the rapid oscillations of moving targets will stand out clearly thereon. It is also possible to have a high enough sampling rate by utilizing such a slow rate of scan that the transmission beam widths overlaps so often within the angle of one two-way transmission beamwidth that the effective sampling rate is equal to the pulse repetition frequency. Since the pulse repetition frequency is always far greater than the high speed scanning rate of 15-30 r.p.s. it is more than sufficient to provide a sampling rate exceeding the ground clutter fluctuation rate.

In a typical case, the slow scan version of this system can be utilized wherein a complete analysis can be made of the target during the time it is illuminated by the antenna beam. Because a complete analysis is made in one scan, synchronization of the horizontal and range sweeps is not necessary and the antenna azimuth reference pulse generator 34 can be eliminated. Also, due to the extremely slow scanning rate, the range of this system is not limited by pulse repetition frequency and other range considerations of rapid scan systems. Using 5 seconds as a sufficient analysis time and a 3° beamwidth (2.1° two-way beamwidth) a 180° sector could be scanned in 7 minutes and 8 seconds.

In both embodiments the timing circuit 35, which controls the pulse rate frequency must be so adjusted that adjacent vertical range traces will be separated by some reasonable amount in order to produce an effective display. For example, with ⅛-inch spacing and a 4 inch square B-scope, 32 vertical range sweeps must be generated for every horizontal sweep. Then the timing circuit 35 must trigger the transmitter 38 and the range sweep generator 36 32 times for every horizontal sweep generated.

FIG. 2 shows a system wherein several modifications have been made to favor the detection of small rapidly moving targets in a background of ground clutter. The logarithmic intermediate frequency amplifiers in the receiver circuits 10 and 11 of FIG. 1 have been changed to linear intermediate frequency amplifiers in receiver circuits 42 and 43 with antennae 44 and 45 respectively. Sensitivity time control is used n the linear intermediate frequency amplifier in order to reduce the amplitude of ground clutter at close range. The intensity control grid 33 of the cathode-ray tube B-scope 26 is not modulated by the signal amplitude of the additive mixer 28 which has been eliminated but rather is regulated by a screen brightness control 46 independent of signal level. Also, the cathode-ray tube B-scope 26 uses a short persistance P-4 screen 47.

FIG. 3 illustrates another means of displaying moving targets in a background of ground clutter using a barrier grid-type storage tube 48 as a video-processing device. The receiver circuits 42 and 43 have linear intermediate frequency amplifiers as described in FIG. 2. The signals from the same-sense and opposite-sense antennae 44 and 45 are applied to differential amplifier 16. The differential amplifier 16 is connected so that the opposite-sense signals will be positive. The differential amplifier 16 will feed two circuits, one being the input to the storage tube 48 and the other being the input to a negative clipper 49 with a sensitivity time control type of bias including a bias slope 51 and an amplitude control 52.

The storage tube 48 has vertical plates 53 that are fed by a range sweep generator 36 operating at the pulse rate frequency of the transmitter 38 which is, typically, 1,000 pulses per second and the horizontal plates 54 are fed by a horizontal sweep generator 24 triggered at one third pulse rate frequency (PRF) or 333 pulses per second by a 3:1 frequency divider 55. The output of the tube 48 passes through a full-wave rectifier 56 and then to a video mixer and amplifier 57. The signal from the negative clipper and amplifier 49 also is applied to the video mixer and amplifier 57, the output of which is connected to the intensity grid of a PPI scope 58 having a P-7 screen 27. An antenna sweep selsyn 59 is connected to the deflection yoke selsyn 61 which mechanically rotates the deflection yoke of the PPI scope 58. A timing circuit 35 simultaneously triggers the transmitter modulator 37, the range sweep generator 36, and the 3:1 frequency divider 55. The range sweep generator 36, as previously mentioned, feeds a signal to the vertical plates 53 of storage tube 48 and also sends its signal to the deflection yoke of the PPI scope 58. The 3:1 frequency divider 55 triggers the horizontal sweep generator 24 at one third of the timing circuit 35 rate which, of course, establishes the transmitter 38 pulse rate frequency (PRF). With a typical antenna scanning rate of 60 r.p.m. (1 r.p.s.) and an antenna beamwidth of 2° the maximum range would be 72 miles and there will be 5.55 pulses per beamwidth.

The operation of this radar arrangement favoring the detection of stationary targets in a background of ground clutter is as follows:

The FIG. 1 circuit employs two receiver circuits 10 and 11 including antennae 12 and 13, respectively, which are sensitive to opposite senses of circular polarization, i.e., if antennae 12 is sensitive to circularly polarized waves of the same sense of rotation as the transmitted transmitted waves then antenna 13 will be sensitive to the opposite. The antennae 12 and 13 receive signals that are applied to receiver circuits 10 and 11, respectively, which provide output signals with a logarithmic amplitude characteristic. The output signals from receiver circuits 10 and 11 are applied to the two branch circuits one of which contains an additive mixer 28 and the other differential amplifier 16. The additive mixer 28 sums the two output signals from receiver circuits 10 and 11 which after passing through a video amplifier 32 are applied to the intensity grid 33 of the scope 26. This results in displaying target intensity as a function of the total amplitudes of the target echoes. This type of circuit is justified on the basis that echoes from stationary targets are usually much stronger than surrounding clutter and hence stationary target prominence is enhanced.

In the differential amplifier 16 the two output signals from receiver circuits 10 and 11 are subtracted from one another. Then the output of the differential amplifier 16 passes through a video amplifier 19 and is applied to the horizontal sweep modulator 23. The antenna azimuth reference pulse generator 34 times the horizontal sweeps to begin at the same position of the rotating transmitter antenna 14. The pulse from the antenna azimuth reference pulse generator 34 triggers a rapid flyback in the horizontal sweep generator 24 to begin a new horizontal sweep. The signal from the horizontal sweep generator 24 is applied to the horizontal sweep modulator 23 where it is mixed with the signal from the differential amplifier 16 and then passes through a push-pull amplification stage in the horizontal sweep modulator 23 prior to application to the horizontal plates 25 of the scope 26.

The pulse from the antenna azimuth reference pulse generator 34 that triggers the start of each new horizontal sweep also triggers the timing circuit 35. The timing circuit 35 sends an identical control signal to the transmitter modulator 37 and the range sweep generator 36 to establish the predetermined number of transmitter pulses and vertical sweeps during each horizontal azimuth sweep. Each control signal pulse triggers the transmitter 38 to send its radar pulse through antenna 14 and triggers the range sweep generator 36 which generates a conventional sawtooth waveform. The sawtooth waveform passes through a typical push-pull amplifier 39 to the vertical range plates 41 of the scope 26. Thus the transmitter 38, range sweep generator 36, and horizontal azimuth generator 24 are all synchronized with the antennae so that the positions of the indicator traces will be repeated on each scan.

The amplitude (either positive or negative) of the difference signal will be approximately proportional to the logarithm of the ratio between the same-sense and opposite-sense signals entering the receiver circuits 10 and 11. This is apparent from the following fundamental relationship, $$\text{Log } A/B = \text{Log } A - \text{Log } B$$

where $A$ and $B$ are input signal amplitudes.

Therefore, the modulation of the horizontal sweep by the output of the differential amplifier 16 will be relatively independent of the total echo signal strength or radar range and/or azimuth and will indicate only the relative amplitudes of the two received signals.

To become fully aware of the advantages gained by this type of signal processing, consider carefully the precise nature of the process. It has been determined experimentally that ground clutter echoes are divided fairly evenly between the same-sense and opposite-sense channels and, in general, fluctuate slowly from predominance in one sense to predominance in the other. Therefore, the amplitudes of the subtracted or difference signals from ground clutter will, on the average, be very much less than the amplitudes of the original signals and will thus avoid danger of saturation in the video amplifiers. When these signals are applied to a P–7 long persistence screen 27 they will appear as a slowly-fluctuating smear. A stationary target may reflect either same-sense of opposite-sense signals but as a steady reflecting surface it will return a strong signal which does not fluctuate appreciably, if at all. Since the stationary target will continually reappear at the same place on each antenna scan it will build up to a high signal level (bright spot) on the long persistance P–7 screen 27 as shown in FIG. 4. In contrast to the strong, stable, stationary target signal and weaker, slowly fluctuating ground clutter, a rapidly moving and relatively small target such as an aircraft will return a relatively weak signal of rapid fluctuation that reaches the extremes of same-sense and opposite-sense circular polarization at a high rate. The rapid fluctuations of the moving target echo are produced partly by fluctuations of the effective radar cross section and polarizing characteristic due to the changing aspects of a complex reflecting surface and partly by doppler beats between it and ground clutter echoes. The detectability of the moving target echo is not a function of its average amplitude but rather is a function of the rate at which the difference in amplitude levels of the two senses change. However, that alone would not distinguish it from the surrounding ground clutter. It is the combination of a rapid fluctuation plus sizeable deflection that produces a readily distinguishable target (see FIG. 4). In addition, the movement of the target in range and/or in azimuth provides another distinguishing characteristic since the human eye is attracted by motion.

In FIG. 2 the modifications in the signal processing are to improve the presentation of signals from rapidly moving targets while minimizing stationary targets and ground clutter. The use of linear intermediate frequency amplifiers instead of logarithmic intermediate frequency amplifiers will make the output of the differential amplifier 16 proportional to the difference between receiver inputs rather than the logarithm of their ratio. This is an important consideration where the rapid fluctuations of relatively weak signals typical of moving targets such as aircraft are to be detected in a background of slowly fluctuating ground clutter or stable targets. The additive mixer 28 (FIG. 1) in controlling the intensity grid 33 with the sum of the two receiver signals obviously favors the strong stationary target signals. Therefore, by controlling the intensity grid 33 with a brightness control 46 independent of signal amplitude (FIG. 2) all targets will appear with the same intensity. The stationary target is further prevented from building up as a high intensity sport by the use of a short persistence P–7 screen 47 instead of the long persistence P–7 screen 27 specified in FIG. 1. The short persistence P–4 screen 47 also minimizes the effect of ground clutter which fluctuates slowly and thus has no buildup from overlapping indicator traces. However, moving target signals, regardless of their relative weakness, fluctuate so rapidly as to produce persistence of vision in the human eye.

Since the intermediate frequency amplifiers (FIG. 2) are linear rather than logarithmic it is also necessary to use sensitivity time control (STC) in order to reduce the amplitude of clutter signals at close range and thus avoid excessive limiting of signals.

The barrier grid storage tube is employed in FIG. 3 to discriminate rapid fluctuations of the polarity of the echoes above a preselected rate of change to distinguish rapidly fluctuating indicator traces. The storage tube 48 displays three consecutive indicator traces side by side at a convenient spacing. In this arrangement three consecutive range sweeps would appear as three separate traces on the screen of the storage tube 33. (RAnge sweeps 4, 5 and 6 are then superimposed on sweeps 1, 2 and 3, respectively. In this manner every sweep will have superimposed upon it the third following sweep. The output of the storage tube 48 is the difference between the sweep that is in the process of being written in and the sweep previously stored. Since the preferred embodiment utilizes a pulse frequency rate (PRF) or 1,000/sec. and the range sweep generator 36 also operates at that rate, the overlapping traces will occur 0.003 seconds apart. It has been determined experimentally that the output signal from the differential amplifier 26 due to ground clutter will not fluctuate appreciably in the period of 0.003 seconds between overlapping indicator traces. HOwever, the differential signal from a moving target echo in ground clutter varies much more rapidly. Therefore, echoes from moving targets will vary more rapidly than every third indicator trace of the storage tube 48. Considering only the doppler fluctuation, the speed of a moving target that will cause a doppler frequency rate to exceed the comparison rate of 333 overlapping traces per second can be easily computed. The doppler frequency for X-band is approximately 33 cycles per second per knot and for S-band approximately 11 cycles per second per knot. Hence, for X-band, aircraft radial speeds in excess of 10 knots and at S-band of 30 knots will cause doppler fluctuations at a more rapid frequency than the comparison rate. The output of storage tube 48 would be rectified so that regardless of the polarity of the output the signal applied to the PPI scope 58 would brighten the trace. Since only rapidly fluctuating echoes would produce a sizeable output from the storage tube 48, the PPI scope 58 would display only rapidly moving targets and the P–7 screen 27 would record their tracks. (Experiments show that an occasional bit of background may occur due to a very short burst of rapid fluctuations of ground clutter echoes). To take care of the special case where the moving targets are broadside and therefore giving no doppler frequency but are producing a very strong steady echo of opposite rotational sense, the circuit through the negative clipper and amplifier 49 is provided. The negative bias on this clipper 49 will decrease as range increases in the same manner that sensitivity time control is applied to the intermediate frequency amplifier stages in FIG. 2. This bias with a variable bias slope 51 and bias amplitude 52 will be adjusted to a condition of level and slope such that the ground echoes at various ranges will reach up to but not exceed cutoff bias, hence eliminating ground echoes. However, the strong broadside echo of predominantly opposite rotational sense from a moving target which is polarized positive through the differential amplifier 16 will rise above the cutoff bias level. The signal from the negative clipper and amplifier 49 that does rise above the cutoff bias level is mixed in the video mixer and amplifier 57 with the output from the storage tube 48 that has passed through the full wave rectifier 56 thus insuring a more reliable signal presentation. The remainder of the circuitry is conventional for a PPI scope 58.

Obviously many modifications and variations of the present invention are possible in the light of the above teachings. It is therefore to be understood that within the scope of the appended claims the invention may be practiced otherwise than as specifically described.

I claim:

1. In a pulse echo-ranging system, means for transmitting electromagnetic waves having a selected sense of circular polarization, first means for receiving first echo signals having said selected sense of circular polarization, second means for receiving second echo signals having a sense of circular polarization, said second means for receiving second echo signals having sense of circular polarization opposite to said selected sense of circular polarization, differencing means connected to said first means and said second means for generating third signals in dependency upon the difference in magnitude of said first echo signals and said second echo signals, azimuth sweep-generating means for generating fourth signals, pulse-timing means for generating fifth signals, means connected to said azimuth sweep-generating means and said pulse-timing means for synchronizing the start of said pulse-timing means and said azimuth sweep-generating means, mixer means, means connected between said azimuth sweep-generating means and said mixer means for applying said fourth signals to said mixer means, range sweep-generating means, means for applying the output of said pulse-timing means to simultaneously trigger said transmitting means and said range sweep-generating means, summing means connected to said first and second means for generating a sixth signal in dependency upon the sum of the magnitudes of said first echo signals and said second echo signals, a cathode-ray tube having been intensity control means and been deflection means, means for applying the output of said mixer means and said range sweep-generating means to said beam deflection means of said cathode-ray tube, plus means for applying the output of said summing means to said beam intensity control means of said cathode-ray tube.

2. In a pulse echo-ranging system, means for transmitting electromagnetic energy having a selected sense of circular polarization, first means for receiving first echo signals having said selected sense of circular polarization, second means for receiving second echo signals having a sense of circular polarization opposite to said selected sense of circular polarization, means connected to said first means and said second means for providing a third signal in dependency upon the difference between the logarithm of the magnitudes of said first echo signals and said second echo signals, visual display means, including an intensity grid, connected to said last mentioned means for visually displaying said third signal in an area type presentation, summing means for summing the magnitudes of the first echo signals and the second echo signals, and means for applying the output of said summing means to the intensity grid of the visual display means.

3. The device as claimed in claim 2 wherein each of said first and second means for receiving includes logarithmic amplifier means.

4. The device as claimed in claim 2 wherein each of said first and second means for receiving includes an antenna responsive to circularly polarized wave energy of selected rotational sense.

5. The device as claimed in claim 2 wherein each of said first and second means for receiving includes an antenna responsive to circularly polarized wave energy of selected rotational sense, and a superhetrodyne receiver with at least one IF amplifier as an integral part thereof.

6. The device as claimed in claim 5 wherein said IF amplifier is a logarithmic amplifier.

7. In a pulse echo-ranging system, means for transmitting electromagnetic energy having a selected sense of circular polarization, first means for receiving first echo signals having said selected sense of circular polarization, second means for receiving second echo signals having a sense of circular polarization opposite to said selected sense of circular polarization opposite to said selected sense of circular polarization, differencing means connected to said first means and said second means for generating a third signal in dependency on the difference between the magnitudes of said first echo signals and said second echo signals, a visual indicator having at least first and second orthogonally disposed been deflection systems a range sweep generator, an azimuth sweep generator, means for applying the output of said range sweep generator, means for applying the output of said range sweep generator to said first been diflection system of the visual indicator, means for mixing the third signal and the output of the azimuth sweep generator to provide a fourth signal, and means for mixing the third signal and the output of the azimuth sweep generator to provide a fourth signal, and means for applying the fourth signal to said second been deflection system of the visual indicator.

8. In a pulse echo-ranging system, means for transmitting electromagnetic energy having a selected sense of circular polarization, first means for receiving first echo signals having said selected sense of circular polarization, second means for receiving second echo signals having a sense of circular polarization opposite to said selected sense of circular polarization, differencing means connected to said first means and said second means for generating a third signal in dependency on the difference between the magnitudes of said first echo signals and said second echo signals, a visual indicator, means for providing said visual indicator with a range sweep and an azimuth sweep, and means for applying said third signal to the visual indicator to provide a visual display of the amplitudes of the third signal.

9. In a pulse echo-ranging system, means for transmitting electromagnetic energy having a selected sense of circular polarization, first means for receiving first echo signals having said selected sense of circular polarization, second means for receiving second echo signals having a sense of circular polarization, differencing means connected to said first means and said second means for generating a third signal in dependency on the difference in magnitude of said first echo signals and said second echo signals, means connected to said differencing means for providing a fourth signal in dependency upon any third signal which has amplitudes that vary in excess of a preselected rate, a cathode ray tube, and means for applying said fourth signal to the cathode ray tube.